United States Patent
Portas et al.

(10) Patent No.: US 6,576,846 B2
(45) Date of Patent: Jun. 10, 2003

(54) TWO-LAYERED ELASTIC TUBULAR COVERING FOR ELECTRIC COMPONENTS, IN PARTICULAR TERMINATIONS FOR ELECTRIC CABLES, AND RELATED MANUFACTURING METHOD AND MOUNTING

(75) Inventors: Francesco Portas, Quattordio (IT); Ubaldo Vallauri, Monza (IT)

(73) Assignee: Pirelli Cavi S.p.A., Milan (IT)

( * ) Notice: Subject to any disclaimer, the term of this patent is extended or adjusted under 35 U.S.C. 154(b) by 0 days.

(21) Appl. No.: 10/004,872

(22) Filed: Dec. 7, 2001

(65) Prior Publication Data

US 2002/0153163 A1 Oct. 24, 2002

Related U.S. Application Data

(62) Division of application No. 08/903,097, filed on Jul. 30, 1997, now Pat. No. 6,342,679.

(30) Foreign Application Priority Data

Jul. 31, 1996 (IT) .......................... MI96A1637
Oct. 29, 1996 (IT) .......................... MI96A2247

(51) Int. Cl.[7] .............................................. H01B 17/32
(52) U.S. Cl. ........................ 174/209; 174/178; 174/196
(58) Field of Search ............................... 174/178, 179, 174/196, 209, 210, 211

(56) References Cited

U.S. PATENT DOCUMENTS 4,128,197 A    12/1978    Ischenko et al. ............. 225/97

(List continued on next page.)

FOREIGN PATENT DOCUMENTS

| CA | 2046682   | 2/1992  |
|----|-----------|---------|
| CH | 640 666   | 1/1994  |
| DE | 1762579   | 1/1958  |
| DE | 1786449   | 1/1972  |
| DE | 36 43 653 | 6/1988  |
| EP | 0 071 953 | 2/1983  |
| EP | 0 120 787 | 10/1984 |

(List continued on next page.)

OTHER PUBLICATIONS

International Standard, International Electrotechnical Commission, CEI, IEC, 1109, p. 7 (1992).

(List continued on next page.)

Primary Examiner—Dean A. Reichard
Assistant Examiner—W. David Walkenhorst
(74) Attorney, Agent, or Firm—Finnegan, Henderson, Farabow, Garrett & Dunner, L.L.P.

(57) ABSTRACT

A tubular elastic covering (730) for electric components (700), having on the whole predetermined values of mechanical and electric/environmental requirements, in which the mechanical requirements include expandibility and elastic recovery in a radial direction, and electric/environmental requirements comprise resistance to tracking and resistance to solar radiation, characterized in that said covering includes an inner insulating layer (680) and an outer insulating layer (660) coaxial with each other, in superposed relationship and bonded together, made of blends of cross-linked polymeric material, in which the cross-linked blend forming the inner layer has predetermined values of said mechanical requirements and the cross-linked blend forming the outer layer has predetermined values of said electric/environmental requirements. Also described is a method of making this covering, a termination (700) for electric cables (605) including this covering and a method of mounting said termination to an electric cable.

8 Claims, 6 Drawing Sheets

U.S. PATENT DOCUMENTS

| | | | |
|---|---|---|---|
| 4,505,033 A | | 3/1985 | Wheeler ................... 29/631 |
| 4,543,381 A | * | 9/1985 | Barlow et al. ............. 524/188 |
| 4,670,973 A | | 6/1987 | Dumont et al. ............. 29/887 |
| 4,689,362 A | * | 8/1987 | Dexter ..................... 524/266 |
| 4,749,824 A | | 6/1988 | Orbeck ..................... 174/179 |
| 4,791,245 A | | 12/1988 | Thornley .................. 174/73.1 |
| 5,171,940 A | | 12/1992 | Vallauri et al. ............ 174/73.1 |
| 5,294,752 A | | 3/1994 | Vallauri et al. ............ 174/73.1 |
| 5,365,020 A | | 11/1994 | Vallauri et al. ............ 174/73.1 |

FOREIGN PATENT DOCUMENTS

| | | |
|---|---|---|
| EP | 0 379 056 | 7/1990 |
| EP | 0 393 495 | 10/1990 |
| EP | 0 422 567 | 4/1991 |
| EP | 0 683 555 | 11/1995 |
| EP | 0 683 557 | 11/1995 |
| FR | 2 363 170 | 3/1978 |
| FR | 2457175 | 12/1980 |
| FR | 2483844 | 12/1981 |
| FR | 2509662 | 1/1983 |
| FR | 2 523 361 | 9/1983 |
| FR | 2541294 | 8/1984 |
| FR | 2579005 | 9/1986 |
| GB | 1170752 | 11/1969 |
| JP | 5-182546 | 7/1993 |
| JP | 6-139860 | 5/1994 |

OTHER PUBLICATIONS

Saito et al.; "New Prefabricated Accessories for 66–154 KV Crosslinked Polyehtylene Cables" Underground Transmission and Distribution Conference, 1974, pp. 224–232.

Le Peurian et al.; "Synthetic Terminations for High Voltage Cables—Assessment of Service Life" Cigre' 1992, 21–201 pp. 1–10.

Xidong et al. "Composite Longrod Insulator—The Solution of Future Line Insulation in China" Proceedings Second international Conference on Properties and Applications of Dielectric Materials; vol.1,Sep. 12–16, 1988, pp. 237–240.

F.Gahungu et al.; "Outdoor and Incorporated Terminations for Extruded Synthetic cables up to 400 ky" Jicable 1995, p. 102.

J.W. Weatherley et al.; "Heat–Shrinkable Terminations for 66kV Polymeric Cables" IEE London Power & Accessories 10 kV–180 kV, Nov. 1986, pp. 238–241.

Masaomi et al. "Method of Cutting Molded Item of Unvulcanized Rubber", Patent Abstract of Japan, vol. 007, No. 21 for Japanese Pub. No. 58 114933 (Aug. 7, 1983).

International Standard, International Electrotechnical Commission, "Test Method for Evaluating Resistance to Tracking and Erosion of Electrical Insulating Materials Used Under Severe Ambient Conditions", CEI, IEC 587 (1984).

* cited by examiner

TWO-LAYERED ELASTIC TUBULAR COVERING FOR ELECTRIC COMPONENTS, IN PARTICULAR TERMINATIONS FOR ELECTRIC CABLES, AND RELATED MANUFACTURING METHOD AND MOUNTING

This is a division of application Ser. No. 08/903,097, filed Jul. 30, 1997, now U.S. Pat. No. 6,342,679, incorporated herein by reference.

BACKGROUND OF THE INVENTION

1. Field of the Invention

The present invention relates to insulation or protection coverings for electric components, such as terminations for electric cables, voltage dischargers or composite insulators. In particular, the present invention concerns coverings adapted to be fitted and elastically clamped to an electric component. It also pertains to the related manufacturing method. More specifically, this invention relates to elastic terminations for cables comprising said coverings and the method of mounting them.

2. Description of the Related Art

In an embodiment known from "New Prefabricated Accessories for 64-154 kV Crosslinked Polyethylene Cables" (Underground Transmission and Distribution Conference, 1974, pages 224–232), an outdoor termination comprises a base plate to which the base of an insulating covering formed of a finned body made of porcelain is linked. A cable conductor is connected to the upper end of the outdoor termination through appropriate support and connection means. A ground electrode and a field control cone of polymeric material is forcedly fitted onto the surface of the cable insulator within a cylinder at its entry into the finned body. The cylinder is made of an epoxy resin. The free space within the finned body is filled with an insulating oil.

However, filling with insulating oil may cause some problems. This insulating oil within the porcelain covering aims at eliminating air. The air may be subjected to an ionization phenomenon causing the electric field to be higher. Such ionization will impair the termination integrity.

CIGRE' 1992, 21–201, entitled "Synthetic Terminations for High Voltage Cables—Assessment of Service Life" teaches a method of replacing the porcelain material in the termination by tubes made of fibre-glass-reinforced plastics coated with anti-tracking insulating rubber. The tubes may shape like a cylinder and/or a cone. The tubes must both ensure protection for the underlying portion against humidity penetration and provide the necessary leak line (profile and fins) for surface currents. In this case, however, insulating oil is still used.

For the purposes of the present application, "tracking", or surface track, means an irreversible degradation of the insulating material surface, involving formation of conductive paths even under dry conditions. This definition is consistent with the specification of IEC 1 109 of 1992 entitled "Composite insulators for a.c. overhead lines with a nominal voltage greater than 1000V. Definitions, test methods and acceptance criteria."

Examples of coatings made of anti-tracking insulating rubber for electric components are known in the art. These coatings for extruded-insulator cables are called "dry terminations" because they are devoid of both the porcelain covering and the insulating oil. These coatings are described in an article entitled "Outdoor and incorporated terminations for extruded synthetic cables up to 400 kV" by F. Gahungu, J. M. Delcoustal, J. Brouet, presented to Jicable 1995. This article describes applications for internal use in cabins (for voltages up to 90 kV), as well as applications for temporary outdoor connections.

European Patent Application No. EP 95 106 910.3 describes a self-bearing dry termination for an electric cable intended for outdoor use for voltages of 10 to 245 kV and above. The electric cable is provided with a covering of elastomeric material fitted onto a tubular element. However, when high-voltage applications are concerned, involving voltages as high as 60 kV and above, this covering can have an early decay if its fitting takes place under strong interference conditions.

Among the materials used to make insulating coverings for applications to outdoor terminations, two fundamental types can be identified: elastic materials and heat-shrinkable materials. The elastic material consists of elastomers having the capability to make manufactured articles adapted to be interference-fitted onto the cable end or a similar support body and to keep a preestablished pressure against it. On the contrary, the heat shrinkable materials enable manufactured articles to be pre-expanded at the factory by using heat sources, generally in the form of a gas flame.

Examples of known devices adopting heat-shrinkable materials include those described in an article entitled "Heat-shrinkable terminations for 66 kV polymeric cables" by J. W. Weatherley R. A. John, M. H. Parry, presented to the IEE London Power & Accessories 10 kV–180 kV, November 1986.

Although heat-shrinkable products are still in use, they are not quite desirable. Employment of a flame as required by heat-shrinkable products involves problems not only for practical-use and safety reasons, but also because of the difficulty in ensuring correct elastic recovery of the covering to the starting sizes, especially when heating is not carried out with particular care and skill.

"Elastic" or "cold-shrinkable" products preferably comprise EPR-based blends or silicone rubber-based blends.

For the purposes of the present description, EPR means blends based on ethylene-propylene polymers in particular comprising EPM (ethylene-propylene copolymer) or EPDM (ethylene-propylene-diene terpolymer) based blends.

European Patent Application No. 92203797.3 describes a tubular element which is formed by a wound strip having adjacent coils made by cutting the surface of the element itself.

European Patent Application No. 90119273.2 describes a storable element of a device to make cable joints. The cable joints consist of a tubular support over which a covering for conductor connections is fitted under elastic expansion conditions. The covering is suitable to make joints between cables selected in a wide range of diameters.

This covering comprises two coaxial and superposed sleeves. The radially inner one has a residual deformation under imposed elongation conditions. The residual deformation of the inner sleeve is lower than that of the radially outer sleeve. The inner sleeve also has a greater elastic modulus.

However, this covering is not adapted to construct terminations and the like which are exposed to phenomena such as surface discharges (tracking).

SUMMARY OF THE INVENTION

The invention comprises a tubular elastic covering for electric components. The elastic covering has predetermined values of mechanical and electric/environmental requirements. The mechanical requirements comprise expandability and elastic recovery in a radial direction. The electric/environmental requirements comprise resistance to tracking and resistance to solar radiation. The covering comprises an inner insulating layer and an outer insulating layer. The inner and outer insulating layers are formed coaxially with each other, superposed and bonded together. The inner and outer insulating layers are made of blends of cross-linked polymeric materials. The cross-linked blend forming the inner layer has predetermined values of the mechanical requirements. The cross-linked blend forming the outer layer has predetermined values of the electric/environmental requirements.

This application has solved the problems by replacing porcelain with polymeric and composite materials in particular in medium- and high-voltage outdoor terminations of extruded cables. Several reasons for using the polymeric and composite materials include:

reducing to the minimum explosion risks in case of fire or internal electric discharge;

reducing weight;

reducing brittleness, so as to prevent damages caused by accidental impacts or, for example, vandalic acts;

increasing transportation and installation simplicity and facility;

increasing safety margins under high-pollution conditions.

This application has considered coverings of the elastic type to be applied to the surface of a cable insulator. However, the requisite qualities to be simultaneously met by the elastic coverings of the above described type are hardly compatible with each other. In particular, it has been noted that an insulating covering for cable terminations of the elastic type must meet requirements of the mechanical type, including expandability and elastic recovery, as well as requirements of the electric/environmental type, including resistance to tracking and solar radiation.

Therefore, one aspect of the present invention relates to the combination of two different blends: one insulating blend for the inner layer (not directly in contact with the weathering agents), characterized by suitable mechanical properties including expandability and elastic recovery; and a second blend for the outer layer suitable to withstand environmental factors affected by pollution including resistance to tracking and to weathering agents including solar radiation. The inner and outer layer are constructed under an expansion state. Resistance to tracking is evaluated on flat test pieces by the method described in specification IEC-587. No particular properties of elastic recovery is however required.

Therefore, in accordance with a first aspect, the present invention relates to a tubular elastic covering for electric components, on the whole having predetermined values of mechanical and electric/environmental requirements, in which mechanical requirements comprise expandability and elastic recovery in a radial direction, and electric/environmental requirements comprise resistance to tracking and resistance to solar radiation, characterized in that said covering comprises an inner insulating layer and an outer insulating layer, coaxially with each other, superposed and bonded together, made of cross-linked polymeric material blends, in which the cross-linked blend forming the inner layer has predetermined values of said mechanical requirements and the cross-linked blend forming the outer layer has predetermined values of said electric/environmental requirements.

In particular, because the outer layer is arranged over a greater diameter than the inner layer, the outer layer undergoes mechanical stresses in a more limited manner. The outer layer submits to lesser amount of expansions and shrinkages compared to the inner layer on which it is superposed.

Preferably the inner insulating layer of the covering has a dielectric strength of at least 15 kV/mm and the outer layer has a predetermined finned profile.

Typically the outer layer has a resistance to tracking at least of class 2.5 measured in accordance with Standard IEC-587.

In a preferred embodiment of the present invention, the inner layer maintains an interference of at least 10%. In addition, the inner layer is pre-expandable by at least 20%.

Preferably the inner layer maintains an interference of at least 25% and more preferably, the inner layer is pre-expandable by at least 50%.

In a further preferred embodiment of the present invention, the inner layer actuates the elastic recovery of the outer layer.

In a second aspect, the present invention relates to a tubular elastic covering for electric components characterized in having a resistance to tracking of at least class 2.5 IEC-587, and a resistance to radiation, measured with a Xenon arc lamp having a power of 6500 W at a distance of 48 cm for at least 2500 hours, such that after a pre-expansion of at least 20%, said covering maintains an interference of at least 10%, wherein said covering comprises at least two coaxial insulating layers bonded together and made of different cross-linked polymeric material blends.

In a third aspect, the present invention relates to a termination for electric cables characterized in comprising an elastic covering in accordance with the above described coverings.

In a fourth aspect, the present invention relates to an electric component comprising a substantially cylindrical electric central element and an elastic insulating covering fitted thereon, characterized in that said covering is in a state of interference of at least 25% and in that after an exposure corresponding to a high-voltage outdoor exposure of at least 60 kV, for a time corresponding to the predetermined minimum lifetime of the electric component, said covering exhibits a surface erosion lower than 10% of the overall thickness, in which said covering comprises two layers of different elastomeric materials.

Preferably, the covering is in a state of interference of at least 25% after being kept for a predetermined period of time in a storehouse under an expansion condition of at least 50%.

In a fifth aspect, the present invention relates to a method of covering an electric element comprising the following steps:

applying a first insulating tubular layer to said electric element;

applying a second insulating tubular layer coaxial with the first one and external to said electric element;

wherein said first tubular layer has predetermined values of expandability and elastic recovery and wherein said second tubular layer has predetermined values of resistance to tracking and resistance to solar radiation.

In addition, the steps of applying a first and a second layer to said electric element comprise the steps of:

disposing said first layer and said second layer coaxial with the first layer and external thereto, on a first removable support;

fitting said removable support with said first and second layer over said electric element;

removing said removable support causing said first and second layers to radially collapse towards said electric element.

Preferably, said second layer comprises a predetermined finned profile.

This involves the further advantage that the termination can be made in the form of a single "monolithic" body, which enables testing at the factory, thereby improving the final reliability in use and simplifying mounting in the field. In addition, due to the above, said elastic coverings can be stored ready for installation.

Finally, in a sixth aspect, the present invention relates to a method of manufacturing a covering body having a predetermined profile for electric components, said method comprising the following steps:

making a first insulating layer of a cross-linkable polymeric material;

making a second insulating layer coaxial with the first layer and external thereto in a different cross-linkable polymeric material, comprising said predetermined profile;

vulcanizing at least one of said inner and outer layers.

Preferably said first layer and said second layer are manufactured and vulcanized separately and are then coaxially superposed upon each other and bonded together.

Typically, said first and second layers are bonded together by interposing an adhesive layer there between. Preferably said adhesive layer comprises a cross-linkable raw rubber layer or a glue.

In a preferred embodiment in accordance with the present invention, first of all the second outer layer is made and then vulcanized; subsequently the material used to make the first inner layer is transferred to the inside of the second vulcanized layer; afterwards the first layer too is vulcanized, so that it is bonded to the second layer.

In an alternative preferred embodiment the first layer is made by moulding, whereas the second layer is formed of two separate parts at least one of which is vulcanized before being disposed coaxially externally of the first layer.

Preferably said predetermined profile is formed on the outer surface of said second layer by an operation involving removal of material portions.

BRIEF DESCRIPTION OF THE DRAWINGS

The present invention will be hereinafter described, by way of non-limiting example, with reference to the accompanying drawings, in which.

DETAILED DESCRIPTION OF THE INVENTION

The stresses encountered while manufacturing an elastic insulating covering for a termination of a medium- and high-voltage electric cable for outdoors can basically be divided into two categories:

stresses of the electric/environmental type, caused for example by pollution, sun radiation, rain, humidity, sudden changes of temperature, snow, ice, wind, surface discharges;

stresses of the mechanical type, in particular dependent on the expansion value to be maintained to obtain a satisfactory interference between the cable and the covering applied thereto and on the value of a pre-expansion to be preferably applied to the elastic covering during its residence in a storehouse. Satisfactory interference means an interference capable of maintaining the covering adhering to the cable so that holding of the electric field generated by the cable is supplied and infiltration of humidity, air bubbles (subjected to a possible ionization phenomenon), or dust is prevented. An example of satisfactory interference is an interference higher than 10% by adopting materials having moduli of the order of 1–10 MPa.

For the purposes of the present description, expandibility (or pre-expandibility) by a predetermined value means an expansion equal to such a value in the absence of tearing. Insulating material or element means a material or element having a volume resistivity greater than $10^{13}$ $\Omega$cm.

In accordance with the present invention the requirements of the mechanical type can be met by the features of the mass of the covering, whereas the requirements of the electric/environmental type as set out above can be met by the surface features of the covering itself.

The situation is particularly complicated for high voltages in the order of 60 kV and higher because the covering is submitted to a higher tracking effect. Elastic coverings currently available on the markets, due to their limited option of physical sizes, cannot withstand electric/environmental stresses higher than medium voltage level.

This application teaches materials capable of operating notwithstanding severe conditions of, for example, environmental pollution, high-industrial-density areas or coastal regions, where tracking phenomenon is particularly important.

Polymer families (EPR and silicone) can be formulated to substantially meet the preestablished requirements. However, the formulated polymer families are limited to stresses caused by one of the two categories discussed above, i.e. the electric/environmental and the mechanical types, to which said polymer families are expected to be submitted during their lifetime.

With respect to the mechanical features, in order to obtain satisfactory interference, the elastic covering is preferably mounted on a component that is at least 10% greater in diameter.

To facilitate mounting on the cable, the covering is preferably pre-expanded on a removable tubular support, of greater sizes than the cable. The covering is treated to withstand expansions of at least 20%, until the covering is installed on the component.

For example, a tubular support of suitable material may require thicknesses of about 3 mm to withstand the centripetal compression exerted by the elastic covering. In addition, if a removable spiraled tubular support as described in the previously described European Patent Application No. 92203797.3 is employed, a further clearance of at least 3 mm on each side is required to undo the coils, as the support is being removed.

As a result, the final diameter of the pre-expanded covering on the tubular support must be increased by at least 12 mm in addition to what is required by the desired interference degree. Therefore, by way of example, for a cable having a cross-section area of 630 mm², adapted for 90 kV voltages, with a diameter on the insulator of about 54 mm, a covering must have a starting inner diameter of about 49 mm to ensure an interference between covering and cable of at least 10% and must therefore undergo an overall pre-expansion of about (54 mm+12 mm−49 mm)/49 mm=35%, without taking into account permanent set.

These features can be met by using EPR- or silicone-based blends.

With respect to the electric/environmental features, a high resistance to tracking can be obtained by using EPR-based blends, having appropriate amounts of, for example, hydrated alumina. This EPR-based blend can also be used for high voltages greater than or equal to 60 kV. However, resistance to solar radiation of the filled blend is increasingly reduced, in particular when an expansion stress is greater than or equal to 20%.

A greater resistance can be obtained in the presence of high expansion, but this will involve lower elastic recovery and lower resistance to tracking.

On the contrary, an excellent resistance to solar radiation can be achieved relatively easily with silicone-based blends, even in the presence of high expansions. However, these blends have a reduced resistance to tracking. Resistance is required for high voltage utilization in order to meet a certain standard. The standard includes, for example, Standard IEC-1109 of 1992 (1000 test hours in saline fog) or French Standard C33-064 of October 1995 entitled "Extrémités synthétiques de type intérieur ou extérieur, sans isolateur en porcelaine, pour câbles à isolations synthétiques de tension assignées supérieures à 30 kV ($U_m$=36 kV) et jusqu' à 150 kV ($U_m$=170 kV)", as described in Annexe C Methods A and B.

It is possible to use high amounts of alumina trihydrate. But this causes a quick decay in the mechanical properties (stress at break, elongation at break, tearing resistance), which will make it very difficult to obtain blends suitable for the intended aim.

Consequently, these materials are not recommended for cables experiencing environmental stresses under high-voltage conditions, a pre-expansion greater than 20%, and an expansion greater than 10%. This condition is necessary to mount the covering on the cable and to obtain a satisfactory interference between cable and covering.

In addition, the elastic coverings may need to be pre-expanded by an amount greater than 50% and to be maintained expanded by an amount greater than 25%. It becomes critical to mount the covering to enable the same termination model for different cable sections, thereby reducing the variety of elastic coverings to be stored.

In order to adopt the technique involving a high expansion, the elastic covering must have excellent mechanical features. For example, commercially available materials need to meet particular mechanical requirements. Some mechanical requirements include: first, resistance to very high pre-expansion states, preferably in the order of 100%, on support tubes, over the whole period of storage; and second, capability to withstand strong expansions at least of 25% and typically up to at least 50%, while simultaneously being provided with an excellent result.

In the case of outdoor applications, this covering must also comply with electric/environmental requirements, for example, sufficient resistant to tracking and solar radiation.

In conclusion, until now it has been impossible to use EPR-based blends and silicone-based blends to obtain a formulation capable of simultaneously meeting all necessary requirements enabling it to be used in elastic terminations for medium and high voltage, particularly in a pre-expanded form on removable supports.

In order to evaluate behavior of a covering for an electric component, from the point of view of its expandibility and elastic recovery, some cylindrical test pieces have been made on a reduced scale, as hereinafter described in Examples 1 and 2.

It has been observed that the outermost layers of an elastic covering undergo much less expansion than the innermost layers. As a result, the mechanical properties of the outermost layer are less stressed than those of the innermost layer.

Experiments show that the environmental factors affect the covering surface layers and subsequently, only after they have succeeded in passing therethrough, the dangerous effects are extended to the innermost layers.

In accordance with the principles of the invention, this invention is directed to making a two-layered covering in which the material formulation of each layer is specialized for substantially resisting specific stresses.

Therefore, this application teaches a formulation of a first insulating blend capable of increasing the mechanical properties (expandibility and elastic recovery) of an inner layer without taking into consideration the resulting decay in the electric/environmental properties (resistance to tracking and solar radiation) and of a second blend capable of increasing the electric/environmental properties of an outer layer without taking into consideration the resulting decay in the mechanical properties.

EXAMPLE 1

Figure 1:
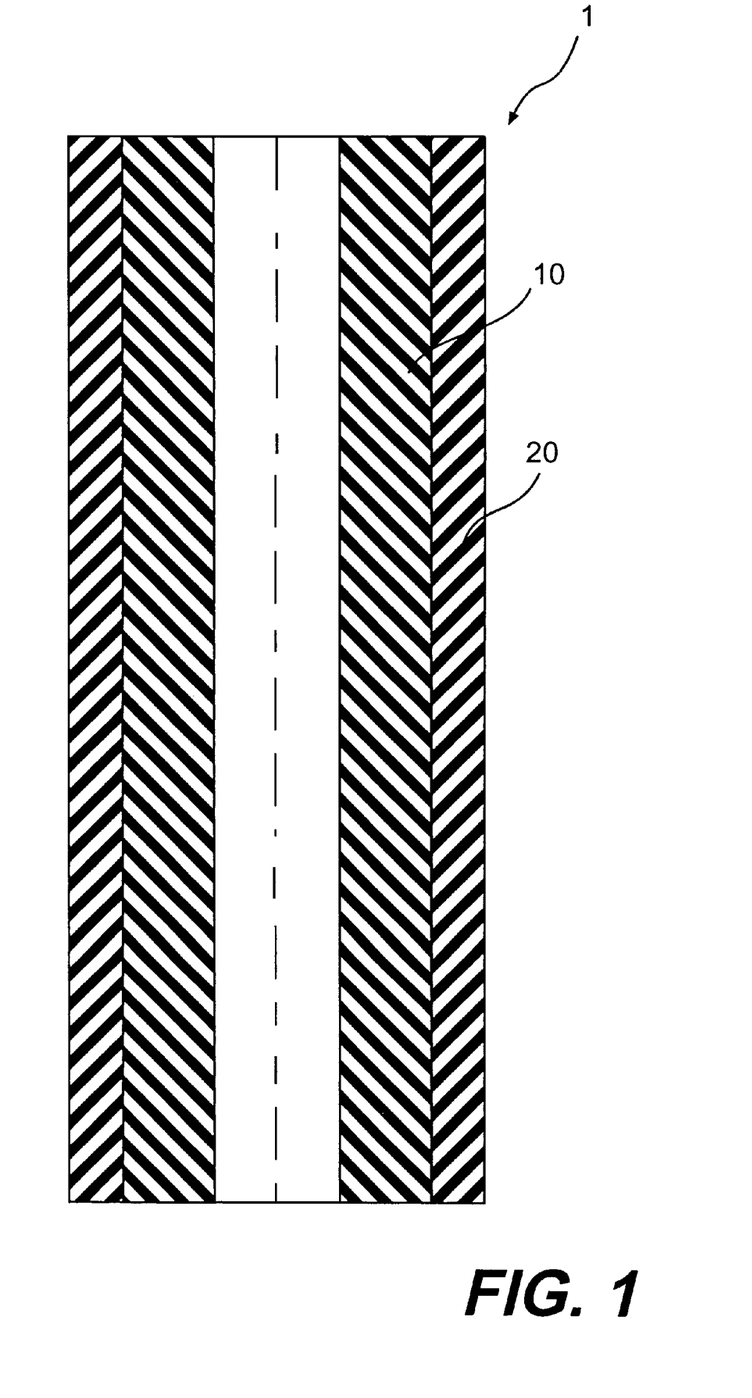
FIG. 1 shows a sectional view of a test piece of a covering made to evaluate the behaviour of one electric component in accordance with the invention.

A specimen 1, as shown in FIG. 1, is formed of:

an inner layer 10, made up of a first elastic insulating blend, having the following sizes: $D_i$=20 mm, $D_e$=46 mm (i.e. with a thickness of 13 mm), L=75 mm, wherein $D_i$ stands for the inner diameter, $D_e$ stands for the outer diameter and L is the test piece length; and an outer layer 20, made up of an anti-tracking insulating blend, having the following sizes: $D_i$=46 mm, $D_e$=58 mm (i.e. with a thickness of 6 mm.), L=75 mm.

The following formulation has been used for the inner layer 10:

TABLE 1

| Composition | phr* |
| --- | --- |
| Ethylene-propylene-diene terpolymer, for example, that is available on the market under the name DUTRAL TER4054 and produced by Enichem Elastomeri | 100 |
| Zinc oxide | 5 |
| Lead oxide | 5 |
| Stearic acid | 1 |
| Calcined kaolin, surface-treated with trimethoxy-ethoxyvinylsilane | 100 |
| Trimethoxyethoxyvinylsilane | 1 |
| Paraffinic plasticizer | 25 |
| Poly-1,2-dihydro-2,2,4-trimethylquinoline | 1.5 |
| Mercaptobenzimidazole | 2 |
| Triallyl cyanurate | 1.5 |
| 40%-active α,α'-bis (tertbutylperoxy) m-p diisopropylbenzene | 5.5 |

*Parts by weight relative to 100 parts by weight of polymer material

Properties of the inner layer 10 made according to the blend set forth in Table 1 after cross-linking include:

TABLE 2

| | Properties | Values |
|---|---|---|
| Mechanical | Tensile stress at break | 9 MPa |
| | Elongation at break | 350% |
| | Modulus at 100% | 2.5 MPa |
| Electrical/ Environmental | Resistance to tracking, measured according to Standard IEC 587 | class 0 |
| | Residual deformation due to an imposed 50% elongation according to Standard UNI 7321-74, on a flat test piece, at 650 C. and after 960 hours | 10% |
| | Dielectric constant, $\epsilon$, determined according to standards ASTM D150 | 2.8 |
| | Dielectric strength determined according to Standard IEC 243 on 2 mm plates | 30 kV/mm |
| | volume resistivity, determined according to Standard ASTM D257 | $10^{15}$ $\Omega$cm |

The outer layer 20 has been subsequently prepared, being made up of a second anti-tracking insulating blend, based on an ethylene-propylene rubber, optimized as regards both resistance to tracking in a greatly polluted environment and resistance to sun radiation, and having the following formulation:

TABLE 3

| Composition | phr* |
|---|---|
| Ethylene-propylene-diene terpolymer, for example that available on the market under the name DUTRAL TER4054 and produced by Enichem Elastomeri | 100 |
| Zinc oxide | 5 |
| Fine-particle alumina trihydrate | 300 |
| Trimethoxyethoxyvinylsilane | 2 |
| Paraffinic plasticizer | 30 |
| Carbon black MT | 0.3 |
| Titanium dioxide Rutile | 20 |
| Stearic acid | 3 |
| Mercaptobenzimidazole | 1.6 |
| Triallyl cyanurate | 1.5 |
| 40% active dicumyl perodixe | 7 |

*Parts by weight relative to 100 parts by weight of polymer material

Properties of the outer layer 20 according to the blend set forth in Table 3 after cross-linking include:

TABLE 4

| | Properties | Values |
|---|---|---|
| Mechanical | Tensile stress at break | 3.5 MPa |
| | Elongation at break | 260% |
| | Modulus at 100% | 2.2 MPa |
| Electrical/ Environmental | Resistance to tracking, measured according to Standard IEC 587 | class 3.5 |
| | Residual deformation due to an imposed 50% elongation according to Standards UNI 7321-74, on a flat test piece, at 650 C. and after 960 hours | 30% |

It is important to note that the elastic blend according to Table 1 has much better mechanical properties (stress at break, elongation at break, residual deformation due to an imposed 50% elongation) than those of the anti-tracking blend according to Table 3. With respect to the electric/environmental properties of the anti-tracking blend, the values of resistance to tracking have passed from class 0 (zero) of the elastic blend to class 3.5 of the anti-tracking blend.

A second cylindrical specimen (not shown) has been prepared which was formed of a single layer having the same sizes as the inner layer 10 alone the anti-tracking layer 20 from test piece 1 is eliminated. The cylindrical specimen has dimensions of: $D_i$=20 mm, $D_e$=46 mm and L=75 mm, and is made of an elastic insulating blend having the same formulation as the inner layer 10.

To foresee the behavior after storage for about two years at room temperature, both test pieces of Example 1 and the second cylindrical specimen have been kept for 40 days at 65° C., imposing the maximum expansion of 100%.

In this case both test pieces have been mounted on a tearable support tube having $D_e$=40 mm with a maximum expansion of the inner layer corresponding to 100%.

Under this condition, the expansion of the inner layer 10 of test piece 1 corresponds with a remarkably lower expansion of the outer layer 20; the radius of the outer layer is determined by:

$$20^2\pi - 10^2\pi = R^2\pi - 23^2\pi$$

R=28.7 from which it results that the inner diameter of layer 20 goes from 46 mm to 57 mm.

Therefore, in consequence of a 100% expansion of the inner diameter of layer 10, an expansion of the inner diameter of layer 20 equals to only 23% occurs (apart from the layer compressibility).

After the above treatment, elastic recovery at room temperature of the test piece 1 and the second cylindrical specimen has been evaluated, by measuring the inner diameter of both test pieces after removal of the support. The second cylindrical specimen had a diameter of about 22 mm, while test piece 1 completed with the anti-tracking covering 20 had a diameter of about 24 mm. This value appears to be slightly greater than the second cylindrical specimen, but in any event acceptable, thereby confirming that the inner layer (with the stated features and thicknesses) is capable of "controlling" the elastic recovery of the assembly.

Preferably, to safely control the elastic recovery of the outer layer 20, the ratio of the inner layer thickness to the overall thickness of the covering is preferably greater than 50% and more preferably than 60%.

EXAMPLE 2

Figure 2:
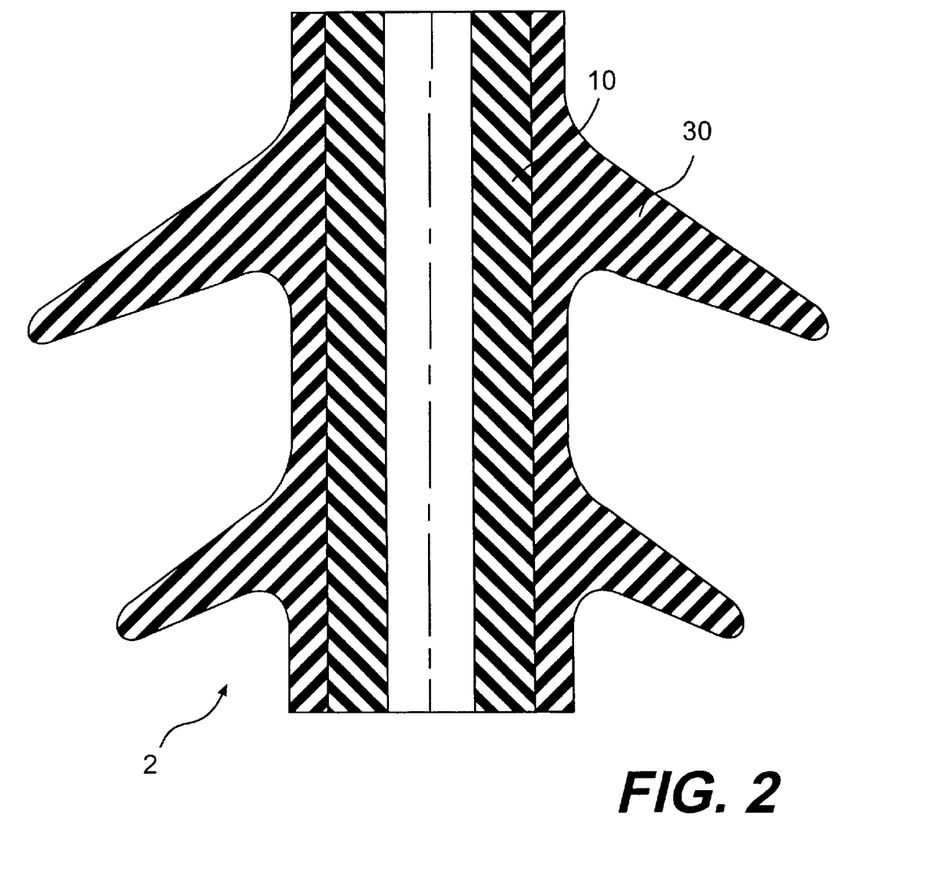
FIG. 2 is a sectional view of a different test piece of a covering made to evaluate the behavior of an electric component in accordance with the present invention.

A further test piece 2 has been made, as shown in FIG. 2, to verify whether the presence of a finned profile worsened elastic recovery of the inner layer.

This test piece 2, has a layer 30 made of the same blend of the outer layer 20 of test piece 1 in Example 1, and having the same base sizes, i.e. $D_i$=46 mm and $D_e$=58 mm, L=75 mm. In addition, layer 30 has a profile provided with a plurality of fins having different alternated sizes. The fin of smaller size has $D_{em}$=126 mm, whereas that of bigger size has $D_{eM}$=146 mm.

Test piece 2 is then submitted to the same treatment as test piece 1. Subsequently, after removal of the support, the inner diameter, value of 24 mm was found, exactly the same as in the preceding case. It was therefore possible to appreciate that the presence of fins does not adversely affect the mechanical performance of the test piece.

Further tests have been carried out on the test piece 1, to evaluate its behaviour in the presence of UV radiation and strong mechanical expansion, that is with values greater than 20%.

For this purpose, two test pieces 1 have been expanded by 50% and 100%, respectively, and submitted in a Weather-o-meter apparatus available from Atlas (USA), to the same type of radiation. The radiation was performed and as provided on page 29 of the, French standard C33-064 edition October 1995. More specifically, the radiation was performed to simulate solar radiation, according to this standard C33-064, which requires the use of a Xenon arc lamp, power 6500 W, a distance between lamp and test piece of about 48 cm (see Annexe C Method A). According to this standard, both test pieces were supposed to be exposed to an overall irradiation of 2500 hours. Both test pieces 1, expanded by 50% and 100%, have greatly overcome this value, arriving at an irradiation of more than 5000 hours, without showing significant signs of decay or microtearing. Since the elastic covering is tested under strong expansion, if microtearings initiate, they will tend to propagate, thereby gradually intersecting the whole covering.

EXAMPLE 3

Figure 3:
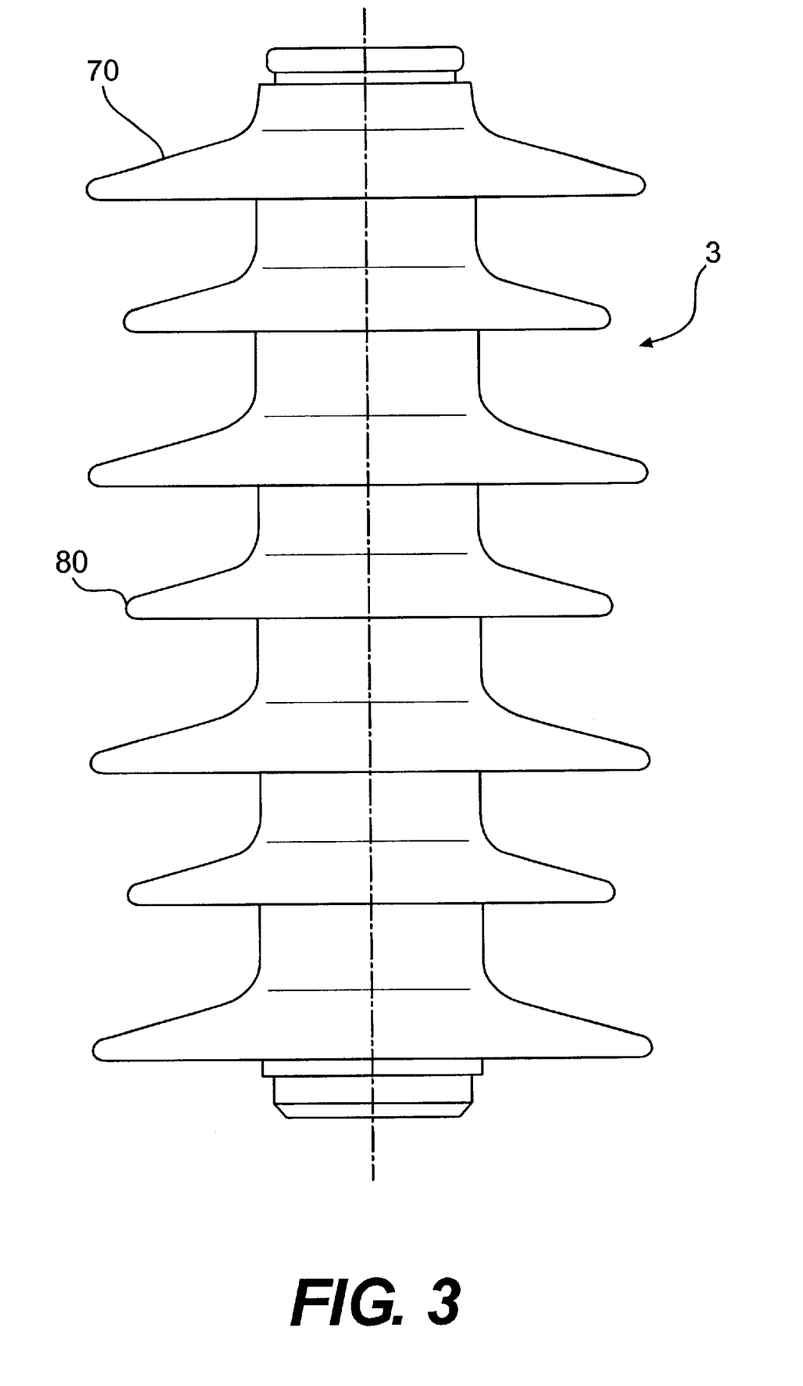
FIG. 3 shows an outer view of a further test piece of a covering made to evaluate the behavior of an electric component in accordance with the present invention.

Finally, two further test pieces 3 have been made, as shown in FIG. 3. Both test pieces 3 comprise the same layers as in Example 2 and having a finned profile suitable to form a covering for a medium-voltage (24 kV) composite insulator. Each test piece 3 has the following sizes: $D_i$=20 mm, $D_e$=58 mm, L=255 mm. In addition, test piece 3 has a profile with a plurality of fins 70, 80 of two different alternate sizes. Fin 80 of smaller size has $D_{em}$=126 mm. Fin 70 of greater size has $D_{eM}$=146 mm. The distance between the greater fin 70 and the consecutive smaller fin 80 is 34 mm, whereas distance between two fins of the same size is 74 mm. The total number of fins is 7.

These test pieces 3 have been first expanded by 25% and 50%, on insulating bars of 25 and 30 mm diameter respectively. Subsequently, after completion with electrodes at their ends, test pieces were submitted to tests of resistance to tracking according to Standard IEC 1109, edition 1992 (1000 hours in saline fog at a suitable voltage of 20 kV). This test is designed to verify behaviour at tracking in the presence of mechanical stress. Both test pieces 3 (expanded by 25% and 50%) have successfully overcome the tests, showing that the previously described covering on the whole possesses excellent properties of resistance to tracking also in the presence of a strong mechanical expansion.

EXAMPLE 4

Application of the present invention to elastic terminations for 90 kV extruded cables is hereinafter described.

Figure 6:
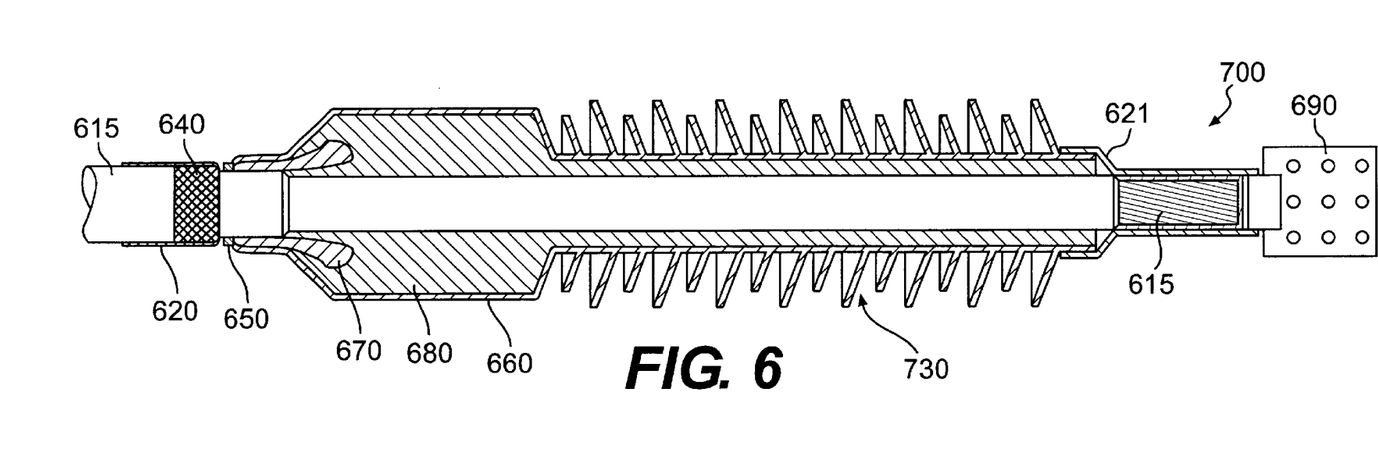
FIG. 6 shows a termination of a high-voltage electric cable in accordance with an embodiment of the present invention.

FIG. 6 shows an elastic termination 700 for 90 kV to be used outdoors and mounted on a cable 615 having a maximum cross-section of 1600 mm².

Termination 700 comprises a finned insulating covering, having an overall length of about 1100 mm. The finned insulating covering comprises a first inner layer 680 and a second outer layer 660 for cable protection. Both inner and outer layers, 680 and 660, respectively, are made of EPR material having the same formulations as the test pieces of Example 1. This covering has a first part with a body diameter in use of about 220 mm and provided with a fin assembly having a maximum diameter of about 250 mm and in which a baffle 670 is housed. The covering also has a second part with a body diameter of about 120 mm and a double series of alternated fins with a maximum diameter of about 240 mm and 200 mm, respectively.

The difference in diameter of the covering between the first and second part is obtained by intervening on thicknesses of the first inner layer alone, which reaches a minimum thickness of about 20 mm, while keeping thickness of the second layer substantially constant over the whole length, of about 7 mm.

An anti-tracking sheath 620 and a connection for ground clamp 640 are applied to the lower end of termination 700. Located at the covering base, at the beginning of baffle 670, is a ring 650 for collecting currents to be grounded.

At the other end of the termination there is a second anti-tracking sheath 621 for protection of the cable head 615, connected to an aluminum connecting plate 690.

Figure 7:
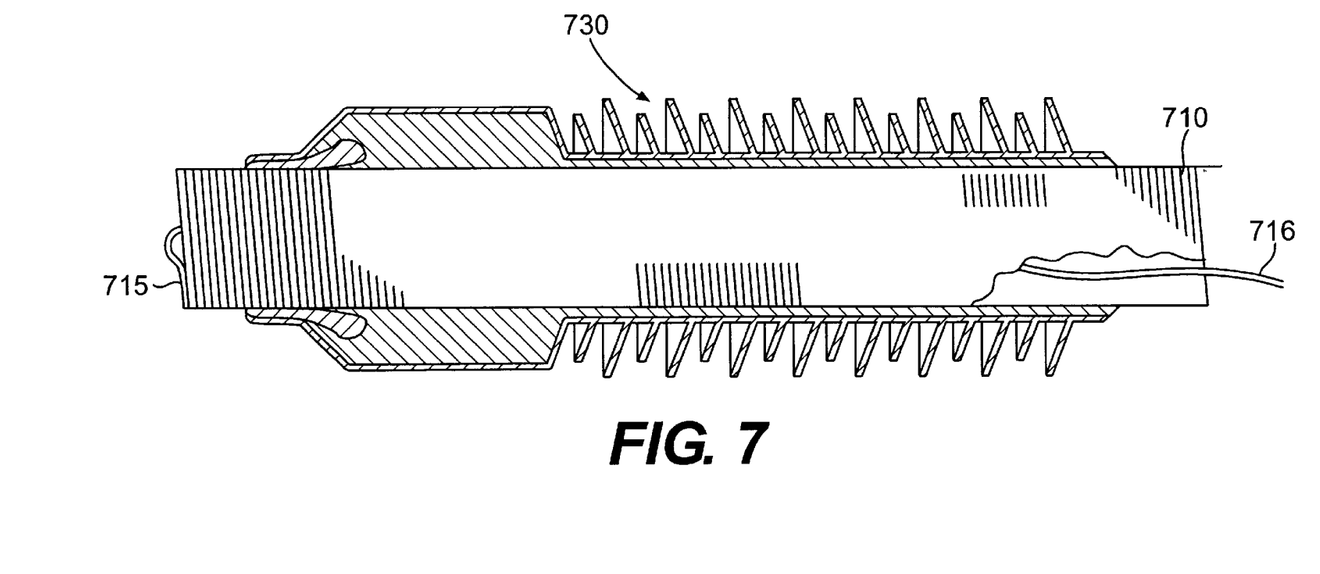
FIG. 7 shows the elastic covering of the termination shown in FIG. 6 pre-expanded over a removable support.

FIG. 7 shows covering 730, which is the same covering as shown in FIG. 6. The covering is mounted on a spirally-cut tubular element 710 made of polypropylene, having $D_i$=85 mm and $D_e$=95 mm, to facilitate its mounting on a cable. For example of the type as described in European Patent Application No. 92203797.3. Tubular element 710 is then formed of a helically-wound strip 715 having adjacent coils, made by cutting the element surface. The strip 715 has a substantially rectangular section and a thickness of 5 mm, and is capable of withstanding the great centripetal compression exerted by the covering.

Operations for mounting the termination to the cable begin with removal of the protection sheath and the cable screen. Then, the interface corresponding to the cable insulator is prepared according to the desired sizes utilizing commercially available equipment. Afterwards, ground connection for the termination is prepared and support tube collapsing is positioned by pulling extension 716. The first coil of strip 715 is separated from the tubular element 710 and thus progressively the subsequent coils are detached as a consequence of the tearing of the strip of reduced thickness so that the tubular element itself, while being undone, is removed and the covering progressively shrinks on the cable 615. Preferably, the covering is collapsed on the cable starting from the base so that air is ejected starting from the baffle towards the cable head. The covering 730 shrinkage exerts an auxiliary force on the coil which is pulled by an extension 716 and facilitates collapsing of the tubular element 710.

Finally, the connecting plate 690 is fastened to the cable conductor while the anti-tracking sheath 621 is positioned so as to ensure a tight fit at this termination part. Alternatively, appropriate insulating tapes may be interposed. The insulating tapes may be made of selfamalgamating rubber, or rubber solutions, following usual modalities.

EXAMPLE 5

In the particular case of applications to make terminations for 90 kV extruded cables, as shown for example in FIG. 6, the conductor sections Ref. #2 preferably range from 240 mm² to 1600 mm² and diameters range preferably from a minimum of 43 mm (in the cable insulator of minimum section) to 78 mm (in the cable insulator of maximum section).

By adopting coverings made in accordance with the invention, it is possible to reduce the number of necessary sizes, in this case sizes being only three for covering 8 different diameters in the stated range.

A preferred example of a range of pre-expanded elastic coverings for 90 kV extruded cables in accordance with the invention is given hereinafter.

By imposing a minimum interference for each covering to be mounted on the cable of lower section equal to 25%, and a maximum expansion on the support tube of the order of 100%, preferably the following division takes place.

A) First covering size. It covers sections from 240 mm² to 630 mm², with a diameter on the insulator varying between a minimum of 43 mm and a maximum of 55 mm.

The inner diameter of the elastic layer therefore will be $D_i=43/1.25$ 35 mm and the maximum expansion in use on the cable of maximum section will be $(55-35)/35\times100=57\%$. The thickness at the rest of the anti-tracking layer is 7 mm, whereas the minimum thickness of the elastic layer is about 20 mm (74%; of the overall thickness of the covering). Thus, the elastic recovery of the assembly will be still more favourable than in the case of test piece 1.

For example, if a spirally cut polypropylene tube of $D_e=70$ mm is selected as support, then the maximum expansion during storage will be $(70-35)/35\times100=100\%$.

B) Second covering size. It covers sections between 630 mm$^2$ and 1200 mm$^2$, with a diameter on the insulator varying between a minimum of 54 mm and a maximum of 66.5 mm. Therefore, the inner diameter of the elastic layer will be therefore $D_i=54/1.25=43$ mm and the maximum expansion in use on a cable of maximum section will be $(66.5-43)/43\times100=55\%$. The thickness of the anti-tracking layer at Test is 7 mm, whereas the minimum thickness of the elastic insulating layer is about 20 mm.

If the support tube has a diameter $D_e=85$ mm, the maximum expansion during storage will be $(85-43)/43\times100=96\%$.

C) Third covering size. It covers sections between 1200 m$^2$ and 1600 mm$^2$, of a diameter on the insulator varying between a minimum of 65.5 mm and a maximum of 78 mm. The inner diameter of the elastic layer therefore will be $D_i=65.5/1.25=52$ mm and the maximum expansion in use will be $(78-52)/52\times100=+50\%$. The thickness of the anti-tracking layer at rest is 7 mm, whereas the minimum thickness of the elastic layer is about 20 mm.

If the support tube has a diameter $D_e=95$ mm, the maximum expansion during storage will be $(95-52)/52\times100+83\%$.

Obviously other criteria to subdivide the diameter ranges on which a single layer is to be mounted can be envisaged, without departing from the protection scope.

A person of ordinary skill in the art will recognize that, by applying the same concepts, terminations for lower voltages, 60 kV for example, or higher voltages, 150 kV for example, can be made which have potential applications in many other countries.

In consequence of the performed tests, it has been found that an elastic covering in accordance with the invention comprises an inner insulating layer and an outer insulating layer, wherein preferably the dielectric strength of the inner insulating layer is greater than or equal to 15 kV/mm as evaluated according to Standard IEC 243 measured on 2 mm plates. Preferably in the covering the inner layer can be elastically pre-expandible by at least 20% of its inner diameter and more preferably in the order of 100%, so that the inner layer in use keeps a suitable interference on the electric component corresponding to at least 10% and more preferably at least 25%, until at least 50%. With respect to the electric/environmental requirements, the outer layer preferably has a resistance to tracking measured according to Standard IEC 587 greater than class 2.5 and more preferably equal to class 3.5, and a resistance to radiation higher than that provided by the above mentioned French Standard C33-064, with a thickness preferably greater than the minimum accepted erosion value, for example greater than 10% of the thickness of the whole covering as provided by said French Standard C33-064.

For the purposes of the present invention it has been ascertained that ethylene-propylene-based blends are suitable for use both to make the elastic insulating inner layer and the anti-tracking outer insulating layer, preferably by using formulations as described in example 1.

Likewise, insulating and elastic, or anti-tracking, silicone rubber based formulations may be used, which are themselves able to meet the necessary requirements, such as, for example, in the following formulations.

Table 5 sets forth an example of an elastic insulating silicone-based blend (polydimethylsiloxane):

TABLE 5

| Composition | phr* |
|---|---|
| Rhodorsil HP-1055 U (by Rhône Poulenc) | 100 |
| 40%-active dicumyl peroxide | 1 |

*Parts by weight relative to 100 parts by weight of polymer material

Its features after vulcanization include:

TABLE 6

| | Properties | Values |
|---|---|---|
| Mechanical | Tensile stress at break | 8 MPa |
| | Elongation at break | 450% |
| | Modulus to 100% | 1.9 MPa |
| Electrical/ Environmental | Resistance to tracking, measured according to Standard IEC 587 | class 0 |
| | Residual deformation due to an imposed 50% elongation established according to Standard UNI 7321-74, on a flat test piece, at 65° C. and after 960 hours | 5% |
| | Dielectric constant, ∈, determined according to Standard ASTM D150 | 3 |
| | Dielectric strength determined according to Standard IEC 243 on 2 mm plates | 18 kV/mm |
| | Volume resistivity, determined according to Standard ASTM D257 | $10^{15}$ Ωcm |

An example of a silicone rubber-based anti-tracking blend include:

TABLE 7

| Composition | phr* |
|---|---|
| Rhodorsil HP-1055 U (by-Rhône Poulenc) | 100 |
| Alumina trihydrate | 1 |
| 40%-active dicumyl peroxide | 1 |

*Parts by weight relative to 100 parts by weight of polymer material

Its features after vulcanization include:

TABLE 8

| | Properties | Values |
|---|---|---|
| Mechanical | Tensile stress at break | 3.5 MPa |
| | Elongation at break | 125% |
| | Modulus at 100% | 2.6 MPa |
| Electrical/ Environmental | Resistance to tracking, measured according to Standard IEC 587 | Class 3.5 |
| | Residual deformation due to an imposed 50% elongation according to Standard UNI 7321-74, on a flat specimen, at 65° C. and after 960 hours: not determined because of specimen tearing. | |

To achieve appropriate values of tracking resistance for the outermost layer, also in this case remarkable amounts of alumina trihydrate have been employed, with a consequent decay of mechanical properties.

We will now describe a method of making these elastic coverings, pointing out that different processes are available for achieving a covering in accordance with the invention.

EXAMPLES OF PROCESSES TO MAKE A COVERING FOR A TERMINATION

PROCESS EXAMPLE 1

In a first process example, the inner elastic insulating part is obtained separately from the outer anti-tracking part, both parts being vulcanized and then coaxially superposed after a weak pre-expansion of the outer part. Finally, the parts are bonded together after previous interposition of a thin layer, as thick as 2 mm or less, of raw rubber, then the assembly is vulcanized again, in an autoclave for example.

PROCESS EXAMPLE 2

In a second preferred example, the elastic insulated part is obtained by using a mould into which the semiconductor baffle 670, previously obtained by moulding, has been inserted; then injection of the insulating blend is carried out followed by vulcanization of same.

By this procedure, an insulating body is obtained well adhering to the baffle and particularly homogeneous in its electric and mechanical properties.

Then the anti-tracking coating is obtained, which for the ease of convenience is divided into two main parts: one part $P_1$ comprising a regular succession of fins preferably of alternated sizes, and one part $P_2$ coating the elastic insulating part and having a greater diameter than part $P_1$, while being substantially devoid of fins.

Part $P_1$ (with finns) is directly obtained by moulding or by adopting a process as described in Italian Patent Application No. MI 96/A 001637.

This process substantially consists of two activity groups: manufacture of a monolithic block, having an outline so as to comprise the envelope of a predetermined final finned profile $P_1$, and preferably mechanical final working of the monolithic block adapted to make this predetermined final finned profile $P_1$.

Figure 4:
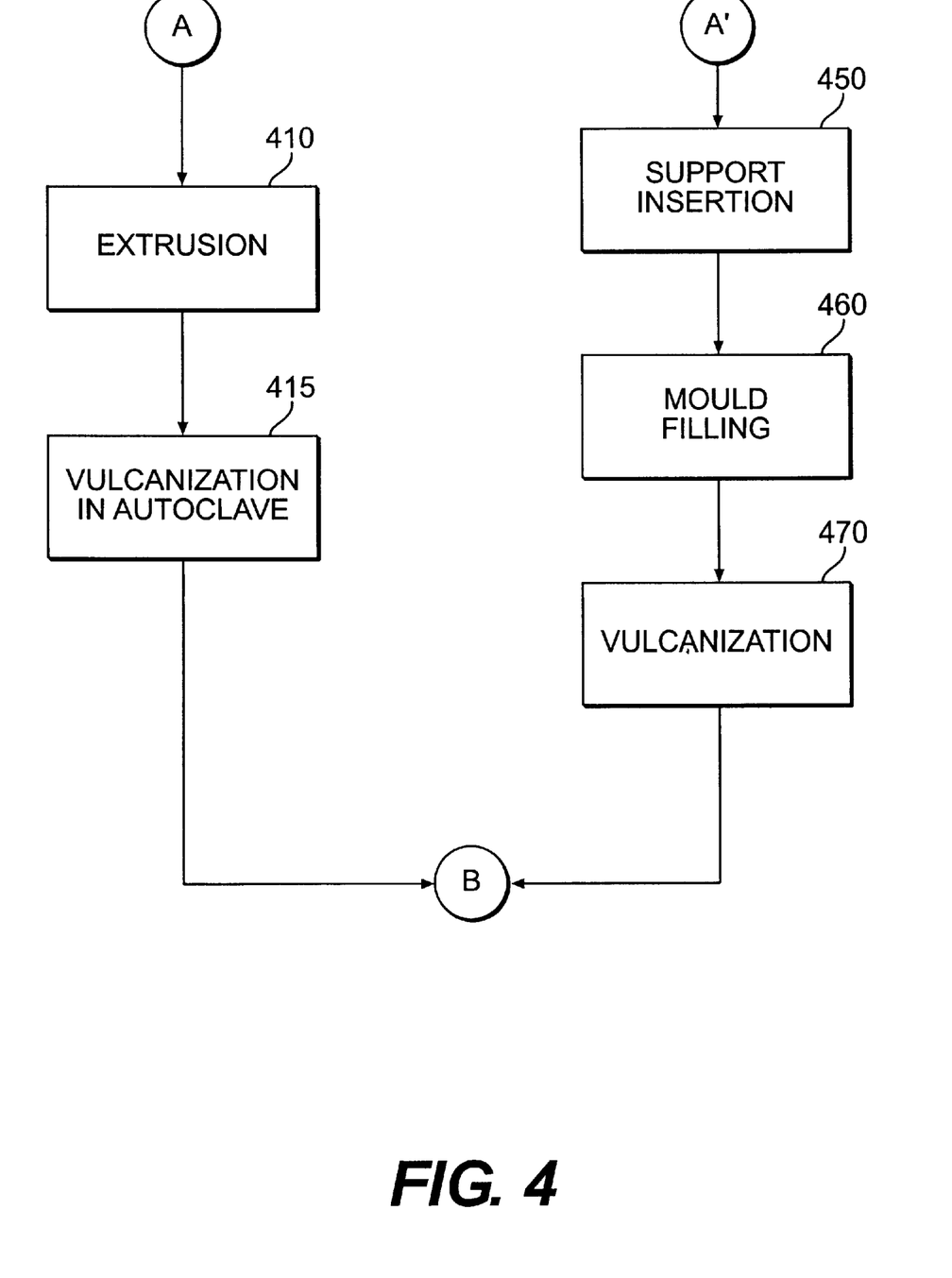
FIG. 4 represents a flow chart diagrammatically illustrating a method of manufacturing a finned covering in accordance with the present invention.

In particular, for the purposes of the present invention, a person skilled in the art will recognize that various techniques are available to make a monolithic block; for example, two possible alternative processes A and A' are shown in FIG. 4 in the form of flow diagrams.

With reference to process A, at the beginning, at step 410, an extruder suitably fed with anti-tracking crosslinkable polymeric material, for example using the previously described anti-tracking blend, extrudes a monolithic block of material having a predetermined outline comprising the envelope of the final finned profile, preferably on a support cylinder or directly on a termination body.

Alternatively, at the same step 410, the extruder extrudes one or more strips of anti-tracking polymeric material capable of being cross-linked, of a predetermined thickness, which are spirally wound, preferably over a supporting cylinder or directly on a termination body, until the predetermined outline size comprising the envelope of the final finned profile is reached. The outline thus obtained may have different surface faults that, however, are not dangerous in that they will be eliminated during the following mechanical working step B.

When the extrusion step of the monolithic block has been completed, at step 415, the extruded block is vulcanized in an autoclave, and also in this step no importance is given to possible surface faults. Then the final working step B described hereinafter follows.

With reference now to process A', at step 450, a supporting cylinder or directly a body of a termination is introduced into a mould. Then at step 460 the mould is subsequently fed with an anti-tracking crosslinkable polymeric material. This material can be introduced into the mould by injection for example or preferably directly from the extruder.

It is important to note that since the die is devoid of deep cavities that are needed for making fins in the case of traditional moulds, neither a particularly fluid material nor a particular injector to enable all its volume to be filled, are required. Therefore, in this case adoption of complicated injection moulds is avoided, while at the same time the most appropriate blends from the point of view of anti-tracking behaviour and cost can be selected, without being compelled to take into account their greater or smaller facility for being moulded. Under these conditions, during the moulding step, surface faults could exist in the block; however these possible faults are not critical in that they will be eliminated during the subsequent step 580 involving working of the block to make a finned profile.

Once filling of the mould die has been completed so as to achieve a monolithic block of a starting outline, this block, at step 470, is vulcanized within the mould. Then, after drawing the block from the mould, there is a final working step as described in the following.

Figure 5:
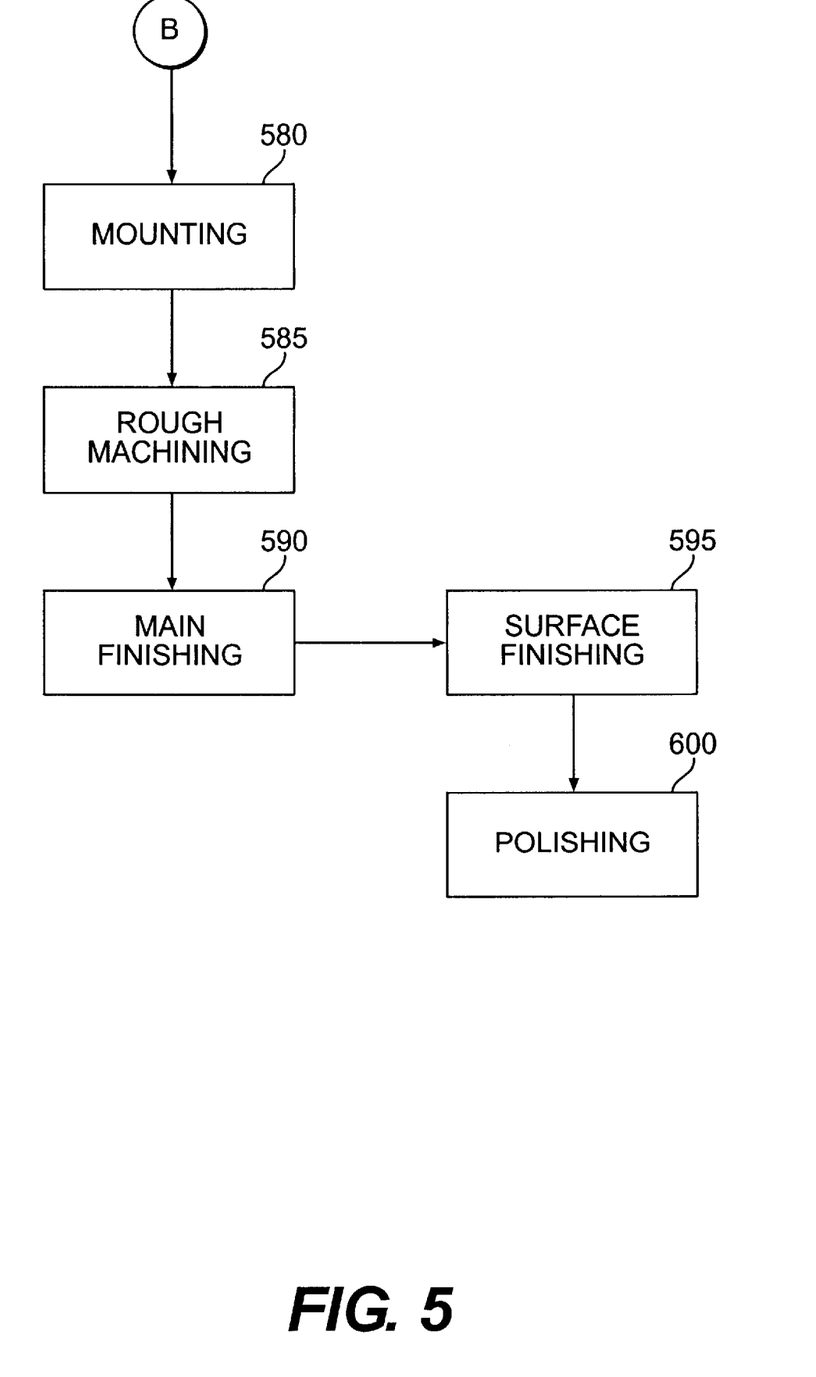
FIG. 5 represents a flow chart diagrammatically illustrating the final working step of the manufacturing method in FIG. 4.

With reference to the flow chart in FIG. 5, the mechanical final working process B of the vulcanized monolithic block is described, which block is obtained both by process A and process A'. At step 580 the vulcanized block fitted over the termination or support cylinder, is mounted to an instrument for final machining, such as a lathe or a grinder. Then, at step 585 the step of rough-machining the block is carried out in order to approach the final finned profile. In this connection, it is to point out that either cutting instruments, abrasive grinding wheels or any other instrument capable of removing material portions from the block can be used. During this step about 70–90% of the excess material relative to the predetermined final finned profile is removed. Preferably instruments of bigger sizes than in the following finish step are adopted, made of both metal materials and plastic iron materials.

At step 590 the main finish step of the just roughmachined block begins, by removing about 30–10% of the excess material to obtain an outer sleeve of a predetermined final profile. In this case too, cutting instruments, abrasive grinding wheels or any other instrument capable of material removal can be utilised. By step 485 process B can be considered as completed; it is however preferable to carry out at least the first one of the two steps hereinafter described for obtaining better finished elastic coverings which therefore will offer better performance in use.

Then step 595 follows in which the outer sleeve of a finned profile is surface-finished by instruments such as fine-grained (of grain 400, for example) grinding wheels. Also in this case material removal takes place but this removal in this case does not exceed 1% of the excess material and therefore does not substantially modify the profile obtained in the preceding operations. Finally, the process terminates at step 600 wherein a final polishing operation is carried out on the finned outer sleeve, by a conventional lapping machine for example.

Production of small batches of particular profiles, during experimentation for example, or of bodies of big sizes may be more economical even in the presence of high amounts of material scraps, only due to the fact that purchase of expensive moulds is avoided.

However, in a preferred embodiment, step 585 of process B is provided to be anticipated, being carried out in process A after the extrusion step (step 410) and before the vulcanization step in an autoclave (step 415). In this manner, once the monolithic block has been made at step 410, by winding of an extruded strip of polymeric material for example, one goes to step 585. During this step rough-machining of the block takes place and as previously described, about 90% of the excess material relative to the predetermined final finned profile is removed by cutting instruments or abrasive grinding wheels. It is important to note that in this case the material is advantageously removed before cross-linking which takes place only at the following step 415, thereby enabling the scrap material to be utilized again and greatly reducing the amount of same.

Once step 585 has been completed, the thus roughly machined block is cross-linked by vulcanization in an autoclave at step 415, thereby terminating the process. When the final mechanical working step is to be executed, the vulcanized and roughly-machined block is mounted, as previously, on the final working instrument, at step 580 which is directly followed by step 590 involving main finish because the rough-machining step 585 has already been completed. Then process B goes on in the same manner as previously described.

In a further preferred embodiment, sequence of steps 585 and 590 of process B is also provided to be anticipated, so that in process A these steps are carried out after the extrusion step (step 410) and before the vulcanization step in an autoclave (step 415). In this manner, once the monolithic block has been made at step 410 by winding of an extruded strip of polymeric material, control passes to step 585. In this step rough-machining of the block takes place and about 70–90% of the excess material relative to the predetermined final finned profile is removed by cutting instruments and abrasive grinding wheels. Subsequently the main finish step (step 590) is carried out by removal of about 30–10% of the excess material. It is important to note that in this case the material is advantageously removed before being cross-linked, which operation takes place only at the subsequent step 415, thereby enabling scrap material to be utilized again and its amount to be reduced. However, the subsequent process operations are made more critical in that the predetermined profile is not stabilized by vulcanization, which operation has not yet been carried out, and therefore is more subjected to accidental modifications that cannot be corrected in the following working steps.

Once step 590 has been completed, the thus finished block is cross-linked by vulcanization in an autoclave, at step 415, so that process A is terminated. On passing to the final mechanical working step, the vulcanized and finished block is mounted, as previously described, on the final working instrument, at step 580; this step is directly followed by a surface finish step (step 595) in that steps 585 and 590 have already been completed. Then process B goes on in the same manner as previously described.

Once the finned part $P_1$ has been obtained, it is bonded to the corresponding elastic insulating part, preferably upon interposition between the two parts of one or more raw rubber layers in the form of small tapes (5×0.5 mm, for example), so as to connect the two bodies to be bonded together by a small interference, preferably between 2 and 5%.

By carrying out vulcanization under pressure, in an autoclave for example, of the raw rubber layer (which can be indifferently made of an anti-tracking blend or an elastic insulating blend by adopting formulations as described in example 1, for example), an appropriate adhesion between the two bodies is achieved.

Part $P_2$ of the anti-tracking covering can be obtained in the same manner. Preferably, part $P_2$ is made by use of a preformed leaf of an anti-tracking raw blend which is wound about the corresponding elastic part to which it is to be bonded.

In this case too, vulcanization, in an autoclave for example, of the anti-tracking layer also carries out adhesion of same to the corresponding elastic insulating part and to part $P_1$ previously disposed and bonded.

PROCESS EXAMPLE 3

In a third preferred example, first the whole assembly forming the anti-tracking covering is obtained, by making a monolithic block for example the outline of which comprises the envelope of the predetermined final profile ($P_1$+ $P_2$).

This block is used as the "container" for the following coaxial injection of the elastic insulating blend, upon insertion of baffle 670, previously made.

Subsequently, cross-linking of the elastic insulating blend, in an autoclave for example, is carried out, so that in this case too not only an excellent adhesion between the two blend qualities and the baffle is achieved, but also a particularly uniform and homogeneous final body in terms of electric and mechanical properties of same.

Working goes on for obtaining the predetermined final profile as previously described with reference to the Italian Patent Application No. MI 96/A 001637.

The main advantage of the third process example consists in simplifying the operations to be carried out (the presence of the raw-rubber tapes being dispensed with, for example) and eliminating the mould that in the other process examples was required for obtaining the elastic insulating part.

Finally, by known methods, as the one described in the European Patent No. 368 236 for example, pre-expansion of the completed termination on a support tube is carried out.

Preferably, the inner layer and outer layer are bonded together in a bidirectional manner, by adopting the above described techniques for example, so as to cause elastic recovery of the inner layer to be transmitted to the outer layer thereby enabling the structure to have the necessary congruence.

Should sizes, materials used for the inner and outer layers and related mounting interference be of such a nature that a reduced expansion of the outer layer and a corresponding sufficient elastic recovery of same are caused, the linking degree between the outer and inner layers can be correspondently reduced or even eliminated.

While application of the present invention only to a component having mechanical and electric/environmental requirements has been described, a person of ordinary skill in the art will understand that the present invention applies to all cases where there is a component in which two or more requirements incompatible with each other are present which can all be met separately by ascribing them to 2 or more associated layers of the component.

What is claimed is:

1. A method of manufacturing a covering body having a predetermined profile for electric components, said method comprising the following steps:

making a first insulating layer of a crosslinkable polymeric material;

making a second insulating layer coaxial with the first layer and external thereto in a different crosslinkable polymeric material, comprising said predetermined profile; and vulcanizing at least one of said first and second layers.

2. A method as claimed in claim 1, in which said first layer and said second layer are manufactured and vulcanized separately and are then coaxially superposed upon each other and bonded together.

3. A method as claimed in claim 2, in which said first and second layers are bonded together by interposing an adhesive layer therebetween.

4. A method as claimed in claim 3, in which said adhesive layer comprises a cross-linkable raw rubber layer or a glue.

5. A method as claimed in claim 1, in which the first layer (10, 680) is made by moulding, whereas the second layer (20, 30, 660) is formed of two separate parts at least one of which is vulcanized before being disposed coaxially externally of the first layer.

6. A method as claimed in any one of claims 1–4 and 5, in which said predetermined profile is formed on an outer surface of said second layer by an operation involving removal of material portions.

7. A method of manufacturing a covering body having a predetermined profile for electric components, said method comprising the following steps:

making an inner insulating layer of a crosslinkable polymeric material; and making an outer insulating layer coaxial with the inner layer in a different crosslinkable polymeric material, comprising said predetermined profile;

wherein, first, the outer layer is made and then vulcanized; subsequently the material used to make the inner layer is transferred to the inside of the outer vulcanized layer; afterwards the inner layer is also vulcanized, so that it is bonded to the outer layer.

8. A method as claimed in claim 7, in which said predetermined profile is formed on an outer surface of said outer layer by an operation involving removal of material portions.

* * * * *